July 31, 1962 A. J. RIPICH 3,047,262
HOLDER FOR FISHING ROD AND THE LIKE
Filed Sept. 20, 1960 3 Sheets-Sheet 1
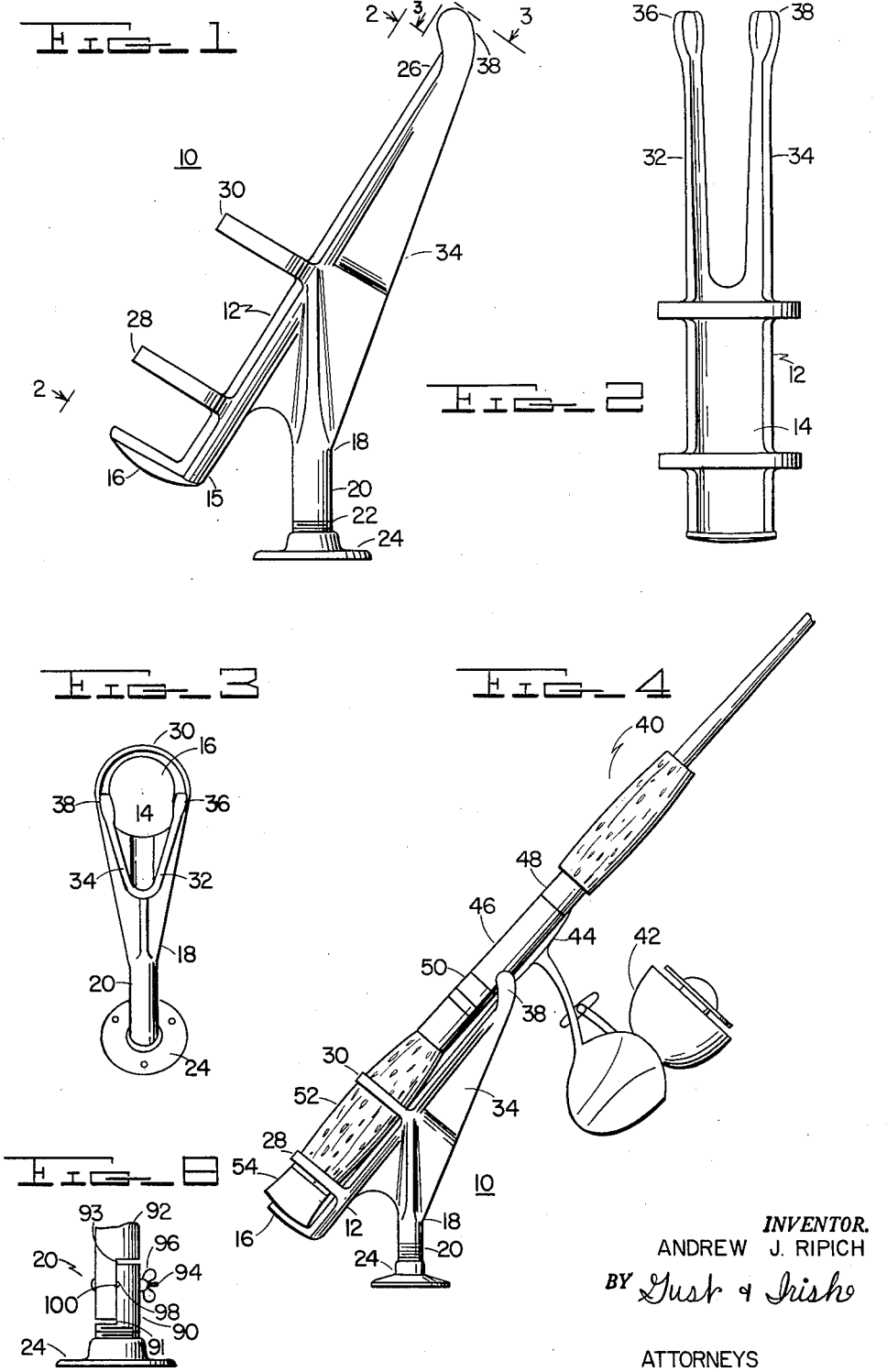
INVENTOR.
ANDREW J. RIPICH
BY Gust & Irish
ATTORNEYS July 31, 1962 A. J. RIPICH 3,047,262
HOLDER FOR FISHING ROD AND THE LIKE
Filed Sept. 20, 1960 3 Sheets-Sheet 2
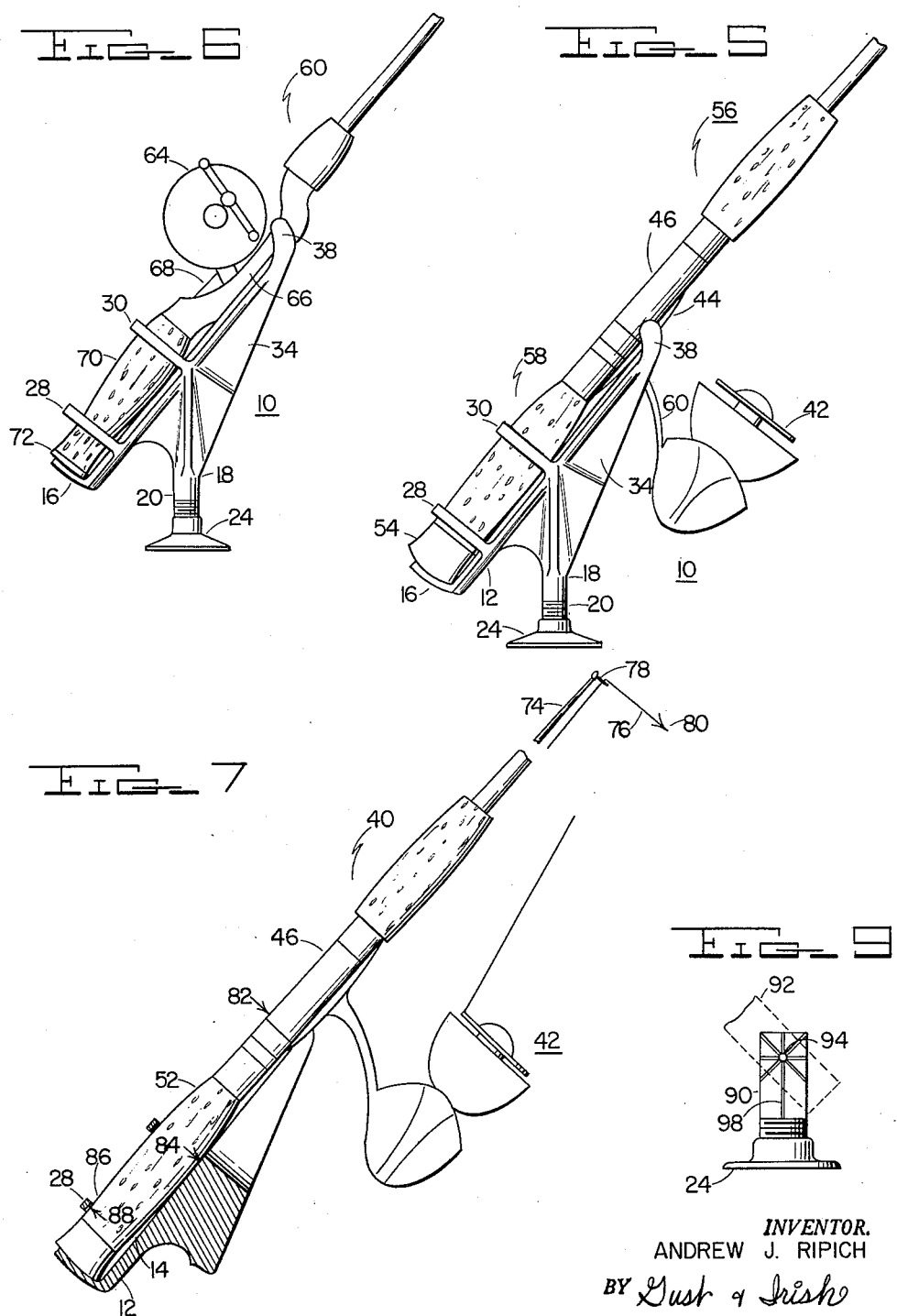
INVENTOR.
ANDREW J. RIPICH
BY Dust & Irish
ATTORNEYS July 31, 1962 A. J. RIPICH 3,047,262
HOLDER FOR FISHING ROD AND THE LIKE
Filed Sept. 20, 1960 3 Sheets-Sheet 3
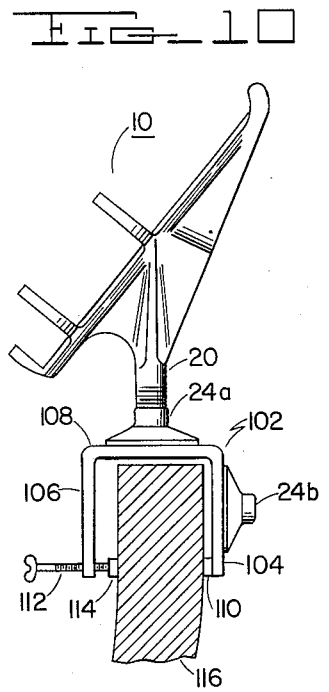
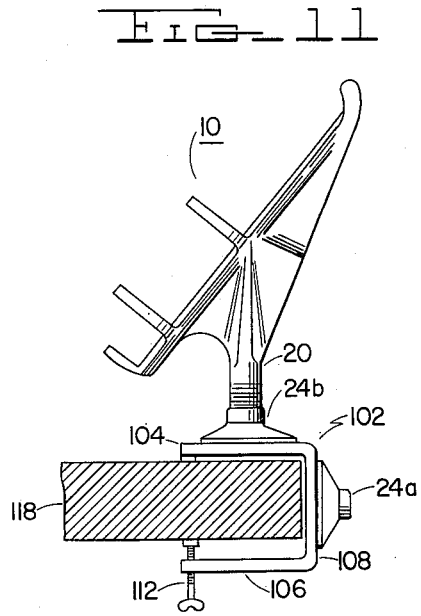
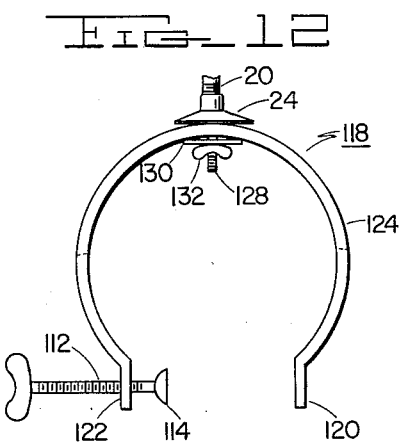
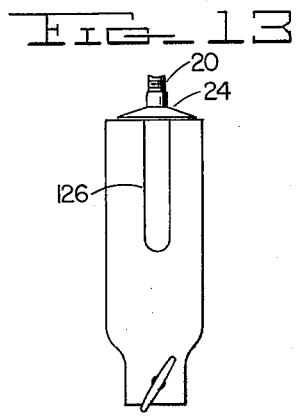
*INVENTOR.*
ANDREW J. RIPICH
BY Gust & Irish
ATTORNEYS

United States Patent Office 3,047,262
Patented July 31, 1962

3,047,262
HOLDER FOR FISHING RODS AND THE LIKE
Andrew J. Ripich, Angola, Ind., assignor to
Carol G. Ripich, Angola, Ind.
Filed Sept. 20, 1960, Ser. No. 57,245
6 Claims. (Cl. 248—42)

This invention relates generally to holders for supporting elongated rod-like devices, such as fishing rods and flagpoles.

Many devices have been provided for attachment to a surface such as a pier or boat seat or rail for removably supporting a fishing rod thereon. However, to the best of the present applicant's knowledge, such prior devices, at best, have been crude and have generally comprised merely a short section of pipe or tubing into which the handle end of a fishing rod was inserted. With such prior devices, the fishing rod and reel were subject to twisting while in the holder, and more importantly, the rod and reel would frequently slip out of the holder when a strong pull was applied to the fish line. It is therefore desirable to provide a holder for removably supporting a fishing rod in which the rod and reel is securely held in place, being restrained against both twisting in the holder and slipping or pulling out of the holder. It is further desirable that such a holder be readily mounted in any desired location, such as a tackle box, boat seat, transom, or rail, or on docks or piers.

It is accordingly an object of my invention to provide an improved holder for removably supporting fishing rods and the like.

Another object of my invention is to provide an improved holder for removably supporting fishing rods wherein the rod and reel is not subject to twisting while in the holder, or slipping out of the holder.

Further objects and advantages of my invention will become apparent by reference to the following description and the accompanying drawing, and the features of novelty which characterize my invention will be pointed out with particularity in the claims annexed to and forming a part of this specification.

My invention, in its broader aspects provides an elongated member having an upwardly extending projection at the rear end thereof for removably supporting the handle end of a fishing rod with the butt thereof engaging the projection. The elongated member has at least one upwardly extending loop element thereon slightly larger than the handle end of the rod and spaced forwardly from the projection for encircling the handle end of the rod. The forward end of the member is bifurcated, defining two transversely spaced legs extending forwardly a substantial distance. The leg elements receive and support therebetween a portion of the rod forwardly of the handle end, thereby preventing twisting of the rod while in the holder. The two legs are further porportioned so that downward force exerted on the outer end of the rod causes the aforementioned rod portion to be wedged downwardly between the legs and the upper surface of the handle end to engage the top portion of the loop element thereby to prevent slipping or pulling of the rod out of the holder.

In the drawing,

FIG. 1 is a side elevational view of the preferred embodiment of the improved fishing rod holder of my invention;

FIG. 2 is a top view of the holder of FIG. 1 taken along the line 2—2 thereof;

FIG. 3 is a front end view of the holder of FIG. 1 taken along the line 3—3 of FIG. 1;

FIG. 4 is a side view of the improved fishing rod holder of my invention showing a rod with a spinning reel supported therein;

FIG. 5 is a side view showing a different rod and spinning reel supported in the improved holder of my invention.

FIG. 6 is a side view of my improved fishing rod holder showing a fishing rod with a casting reel supported therein;

FIG. 7 is a fragmentary view, partly in cross-section, showing the action of my improved fishing rod holder in preventing slipping of the fishing rod out of the holder;

FIG. 8 is a fragmentary side view showing a modified form of my invention;

FIG. 9 is a broken away view further showing the modification of FIG. 8;

FIGS. 10 and 11 show another modification of my invention; and

FIGS. 12 and 13 show a further modificaion of my invention.

Referring now to FIGS. 1, 2 and 3 of the drawing, the preferred embodiment of the improved fishing rod holder of my invention, generally indicated at 10, is integrally formed of suitable material, such as cast aluminum, and includes an elongated portion 12 having a generally semi-circular inner surface 14, as best seen in FIG. 3. An upwardly extending projection 16 is formed on the rear end of elongated portion 12. An elongated base portion 18 depends from the portion 12 approximately intermediate its ends and terminates in a lower end 20 which is threaded as at 22 for insertion in a threaded flange member 24, which in turn may be secured to any desired surface, such as a pier, boat seat or rail, etc., in any suitable fashion, as by threaded fasteners. Base portion 18 supports portion 12 at an angle with the horizontal, as shown, with end 15 of portion 12 on which projection 16 is formed being lower than the other end 26 of portion 12.

A pair of upwardly extending loop elements 28 and 30 are formed on portion 12 respectively having annular inner surfaces which define a circle with the semi-circular inner surface 14 of portion 12. Loop element 28 is spaced forwardly from projection 16 and loop element 30 is spaced forwardly from loop element 28, with its base in general alignment with base portion 18, as shown.

The forward end 26 of portion 12 is bifurcated, as best seen in FIG. 2, to form transversely spaced apart legs 32 and 34 extending forwardly from a point adjacent loop element 30. Legs 32 and 34 respectively have upwardly extending projections or horns 36 and 38 formed at their forward ends and are respectively inclined outwardly and forwardly to define an angle therebetween. Legs 32 and 34 are further inclined inwardly and downwardly, as best seen in FIG. 3.

Referring now particularly to FIG. 4 in which like elements are indicated by like reference numerals, there is shown a fishing rod 40 having a conventional spinning reel 42 with its mounting flange 44 secured to portion 46 of the rod 40 by conventional grip elements 48 and 50. It will be seen that the semi-circular inner surface 14 of portion 12 of the holder receives and supports the handle 52 of rod 40 with the butt 54 engaging projection 16; loop elements 28 and 30 are slightly larger than handle 52 to permit its insertion therethrough, and it will be seen that the loop elements 28 and 30 thus loosely encircle handle 52. It will now be readily seen that the portion 46 of rod 40 and the mounting flange 44 of the reel 42 are received between the projections 36 and 38 of legs 32 and 34, being supported thereby by virtue of the inclination of the legs outwardly and forwardly on the one hand and inwardly and downwardly on the other hand. Thus, the weight of the rod 40 tends to wedge portion 46 between projections 36 and 38 and in addition, positioning of the reel mounting flange 44 between projections 36 and 38 of legs 32 and 34 prevents the rod 40 and reel 42 from twisting in the holder 10. It will be observed by virtue of the bifurcated configuration of the forward end 26 of the portion 12, the holder will accommodate a variety of different spinning reel rods. Thus, as shown in FIG. 5, a spinning reel rod 56 having a substantially shorter handle end 58 may be accommodated since the rod element 60 which supports spinning reel 42 from mounting flange 44 can be accommodated between the legs 32 and 34, as shown.

Referring now to FIG. 6 in which like elements are still indicated by like reference numerals, a fishing rod 60 having a casting reel 64 thereon is shown supported in the holder 10 of my invention. Here, rod 60 has a depressed or eccentric portion 66 within which the mounting flange 68 of casting reel 64 is supported. Here it will be seen that handle 70 of rod 60 is again supported by portion 12 of the holder 10, being encircled by loop elements 28 and 30 and having its butt 72 engaging projection 16. Here it will be seen that the reel supporting portion 66 of rod 60 is positioned between projections 36 and 38 of legs 32 and 34, being supported thereby by virtue of the respectively inward and downward, and outward and forward inclination of legs 32 and 34, the weight of the rod again tending to wedge portion 66 of rod 60 between projections 36 and 38 of legs 32 and 34, thereby to prevent twisting of the rod and reel within the holder. Again it will be observed that the holder 10 will accommodate casting rods having a substantial variation in length since it is only necessary that projections 36 and 38 on legs 32 and 34 engage some part of the reel supporting portion 66.

Referring now to FIG. 7 in which like elements are again indicated by like reference numerals, there is shown the action of my improved holder in preventing dislodgment or slipping out of the rod and reel from the holder responsive to a pull on the outer end of the rod. Here, the end 74 of rod 40 is shown with line 76 from spinning reel 42 extending through loop 78 and having a pull exerted thereon, as shown by the arrow 80, thus exerting a downward force on portion 46 of the rod, as indicated by the arrow 82. This downward force exerted on the outer end 74 of the rod by the pull 80 on the line 76 causes the handle 52 to tend to pivot about the inner surface 14 of portion 12, as shown by the arrow 84 with the upper surface 86 of the handle 52, which is conventionally formed of material such as cork or rubber, thus engaging loop element 28, as shown by the arrow 88. Further, and most importantly, by virtue of the above described inclination of legs 32 and 34 and the provision of projections 36 and 38, and further by virtue of the fact that legs 32 and 34 have some resilient properties, being preferably formed of cast aluminum, the downward force 82 exerted on reel mounting portion 46 wedges portion 46 further downwardly between projections 36 and 38. This engagement of the upper surface 86 of handle 52 with loop element 28 and the wedging of reel mounting portion 46 between projections 36 and 38 responsive to downward pull on the outer end of the rod 40 causes the rod to be tightly engaged by the holder, thus preventing its slipping out of the holder.

Referring now to FIGS. 8 and 9, in which like elements are indicated by like reference numerals, it may be desirable to provide for mounting of the holder of my invention at a selective angle with respect to the supporting surface. To accomplish such mounting, the lower end 20 of base portion 18 is longitudinally split, as shown, to provide lower and upper portions 90 and 92 respectively, having flat surfaces 91 and 93 which are arranged in juxtaposition. A stud 94 extends through aligned openings in the lower and upper portions 90 and 92 thus pivotally connecting the same and a wing nut 96 is provided on stud 94 for securing the lower and upper portions 90 and 92 at the desired angle. In order to insure that the lower and upper portions 90 and 92 of end 20 remain firmly secured at the selected angle, lower portion 90 is provided with a plurality of grooves 98 defining a plurality of predetermined angles with the plane of the flange member 24 and the upper portion 92 is provided with corresponding and complementary projections 100 which engage grooves 98. While four grooves 98 are shown in FIG. 4, thereby permitting selective positioning of upper portion 92 parallel with, at right angles to, or at 45° with respect to the plane of flange 24, it will be readily understood that additional grooves 98 and projection 100 may be formed in lower portion 90 and upper portion 92, respectively, in order to provide a greater selection of angles.

Referring now to FIGS. 10 and 11, it is desirable to provide an arrangement by which my improved fishing rod holder may be removably mounted on a vertically extending edge, such as the gunwale of a boat, or a horizontally extending edge, such as the edge of a pier or a dock. To accomplish this objective, I provide a C-clamp member 102 having legs 104 and 106 with connecting bar portion 108 and with mounting flanges 24(a) and 24(b) secured to the outer surface of leg 104 and bar portion 108 in any suitable manner, as by welding; in the alternative, C-clamp member 102 with mounting flanges 24(a) and 24(b) thereon may be integrally formed as by casting or stamping. Leg 104 has a surface-engaging portion 110 and leg 106 has a manually adjustable screw 112 extending therethrough having another surface-engaging portion 114 thereon.

Referring particularly to FIG. 10, the C-clamp member 102 is shown as being secured to vertically extending edge 116 such as the gunwale of a boat with end 20 of holder 10 being threadingly inserted in flange 24(a) on bar portion 108. Referring now to FIG. 11, the C-clamp 102 is shown as being secured to a horizontally extending edge 118, such as the edge of a pier or dock and, in this arrangement, end 20 of holder 10 is threadingly inserted in flange member 24(b) on leg 104 of the C-clamp member 102. It can now be seen by virtue of the provision of C-clamp member 102 with flanges 24(a) and 24(b) mounted on bar portion 108 and leg 104 respectively, the end 20 of holder 10 may be selectively secured to either flange 24(a) or 24(b) depending on the attitude of the edge to which the C-clamp member is secured. It will be readily apparent that the adjustable arrangement of FIGS. 8 and 9 may be equally advantageously employed with the removable mounting arrangement of FIGS. 10 and 11.

The C-clamp member 102 of FIGS. 10 and 11 will be seen to have utility in applications other than mounting my improved fishing rod holder 10. Thus a pair of C-clamp members 102 respectively having one flange member 24(b) on their bar portions 108 may be employed for supporting a clothes bar in a closet and likewise a C-clamp member having one internally threaded flange member 24 on leg 104 may be employed for such purposes as supporting a flag pole, light or fishing net on a boat. However, the preferred embodiment of my C-clamp member, by virtue of its great flexibility in the support of other members, is that shown in FIGS. 10 and 11, including two internally threaded flange members 24(a) and 24(b) on bar portion 108 and leg 104 respectively. It will be readily apparent that it is not necessary that the flange members 24(a) and 24(b) be internally threaded, and that on the contrary, flange members may have sockets formed therein for removably receiving other members which may be secured in place in any suitable manner, as by set screws.

Referring now to FIGS. 12 and 13, another mounting arrangement for my improved fishing rod holder is shown in which the attitude of the holder is selectively adjustable. Here, a C-clamp member 118 is provided formed of flat strap steel with leg portions 120 and 122 joined by a generally C-shaped portion 124. Leg portion 120 is adapted to engage one surface of an edge while adjustable screw 112 extends through leg portion 122 and has one surface engaging portion 114 thereon. The body portion 124 of the C-clamp member 118 has an elongated slot 126 formed therein, as seen in FIG. 13, and flange member 24 has a threaded stud 128 extending downwardly therefrom through the slot 126 with a suitable washer 130 and thumb screw 132 being positioned thereon, as shown. It will thus be seen that the flange member 24 in this embodiment is positioned on the outer surface of the body portion 124 of C-clamp member 118, being retained at any selected position between the extremities of slot 126 by tightening of the thumb screw 132. As in the case of the embodiments of FIGS. 10 and 11, end 20 of holder 10 is threadingly inserted in the threaded opening in flange member 24. It will readily be seen that the C-clamp member 118 of FIGS. 12 and 13 with one or more flange members 24 selectively mounted thereon may be employed for receiving and supporting objects other than my fishing rod holder 10.

While my improved holder is especially designed for use with fishing rods, it will be readily apparent that it is also useful for supporting other elongated objects, such as flagpoles. In that case, the weight of the flag suspended from the outer end of the pole will provide the above referred to wedging effect of the portion of the pole supported between projections 36 and 38 thereby preventing twisting of the pole in the holder, or its dislodgement therefrom.

While I have illustrated and described a specific embodiment of my invention, further modifications and improvements will occur to those skilled in the art, and I desire therefore in the appended claims to cover all modifications which do not depart from the spirit and scope of my invention.

What is claimed is:

1. An integrally molded holder for removably supporting fishing rods and the like comprising an elongated member having means intermediate its ends for removably supporting the lower surface of the handle of a fishing rod forwardly of the butt thereof, said member having an upwardly extending projection at the rear end thereof for removably supporting the end of said butt, said member having means for attaching the same to a surface, said member having at least one loop element thereon extending upwardly from said supporting means spaced forwardly from said projection and cooperating with said supporting means to encircle said handle, the other end of said member being bifurcated defining two transversely spaced elongated legs extending generally parallel with said rod for receiving therebetween and supporting a portion of said rod thereby preventing twisting of said rod in said holder, said legs having resilient properties so that downward force exerted on the outer end of said rod causes said rod portion to be wedged downwardly between said legs and the upper surface of said handle end to engage the top portion of said loop element thereby to prevent slipping of said rod out of said holder.

2. The holder of claim 1 wherein said legs respectively have upwardly extending projections respectively formed at their outer ends, said legs being respectively inclined forwardly and outwardly to define an angle therebetween.

3. The combination of claim 1 wherein said member has two spaced apart upwardly extending loop elements for respectively encircling said handle with the forward loop element being adjacent the junction of said legs and the rearward loop element spaced from said projection.

4. The combination of claim 1 wherein said member in cross-section has a generally semi-circular inner surface proportioned to receive said handle, and wherein said loop element has a generally annular inner surface generally defining a circle with said member.

5. The holder of claim 1 wherein said legs are approximately one half the over all length of said member.

6. A holder for removably supporting fishing rods and the like comprising an integrally molded member having an elongated body portion which in cross-section has a generally semi-circular inner surface for removably receiving and supporting the handle end of a fishing rod, an upwardly extending projection formed at the rear end of said body portion for removably engaging the butt of said handle end, and an elongated base portion extending downwardly from said body portion generally midway between its ends for supporting the same at an angle with the horizontal and with the rear end lower than the forward end thereof, said body portion having two spaced apart upwardly extending loop elements formed thereon slightly larger than said handle end for encircling the same, said loop elements respectively having generally annular inner surfaces generally defining circles with said inner surface of said body portion, the rearward loop element being spaced from said projection and the forward loop element being adjacent said base portion, the forward end of said body portion being bifurcated defining two transversely spaced legs extending forwardly from a point adjacent the forward loop element generally parallel with said rod, said legs being approximately one half the over all length of said body portion, said legs respectively having upwardly extending projections formed at their forward ends for receiving therebetween and supporting a portion of said rod forwardly of said handle end thereby preventing twisting of said rod in said holder, said legs respectively having their inner surfaces inclined inwardly and downwardly, said legs further being respectively inclined forwardly and outwardly to define an angle therebetween and having resilient properties whereby downward force exerted on the outer end of said rod causes said rod portion to be wedged downwardly between said leg projections and the upper surface of said handle end to engage the top portion of at least one of said loop elements thereby to prevent slipping of said rod out of said holder.

References Cited in the file of this patent

UNITED STATES PATENTS

| | | |
|---|---|---|
| 2,099,254 | Ballman | Nov. 16, 1937 |
| 2,341,065 | White | Mar. 24, 1953 |
| 2,657,492 | Skorr | Nov. 3, 1953 |
| 2,690,317 | Hoffmann | Sept. 28, 1954 |